United States Patent [19]

Mack

[11] Patent Number: 4,690,720

[45] Date of Patent: Sep. 1, 1987

[54] METHOD OF MANUFACTURING MULTILAYER LABELS AND APPARATUS THEREFOR

[75] Inventor: Jory B. Mack, Chicago, Ill.

[73] Assignee: Pamco Label Co., Rosemont, Ill.

[21] Appl. No.: 819,516

[22] Filed: Jan. 16, 1986

[51] Int. Cl.[4] ............................................. B32B 31/00

[52] U.S. Cl. ..................................... 156/248; 29/124; 29/132; 156/249; 156/253; 156/267; 156/268; 156/270; 156/277; 156/301; 156/302; 156/384; 156/513; 156/522; 156/552; 428/43

[58] Field of Search .................. 29/124, 132; 156/248, 156/268, 249, 270, 253, 301, 267, 302, 277, 552, 522, 513, 384; 226/190; 428/43

[56] References Cited

U.S. PATENT DOCUMENTS

| | | | |
|---|---|---|---|
| 2,369,635 | 2/1945 | Bacon | 29/132 |
| 3,524,782 | 8/1970 | Buske | 156/253 |
| 4,359,358 | 11/1982 | Hattemer | 156/301 |
| 4,488,922 | 12/1984 | Instance | 156/277 |

*Primary Examiner*—John J. Gallagher
*Attorney, Agent, or Firm*—Garrettson Ellis

[57] ABSTRACT

Multilayer labels may be manufactured by providing at least one continuous web with adhesive applied at least to spaced leaflet site portions of one face thereof. One applies leaflet members to the spaced leaflet site portions, followed by pressing the leaflet members and web together to adhere the leaflet members to the web. Thereafter, one cuts the continuous web to provide a plurality of separate, leaflet-carrying labels.

31 Claims, 7 Drawing Figures

FIG. 5
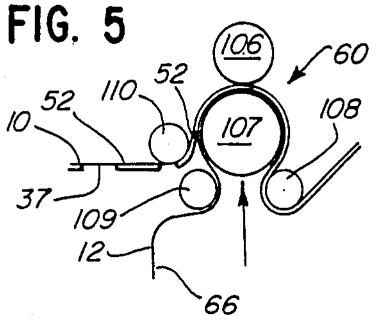
FIG. 6
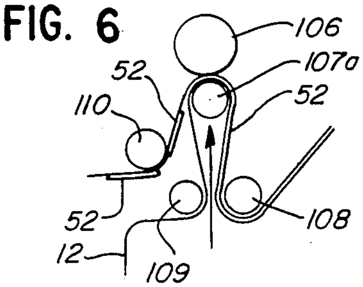
FIG. 4
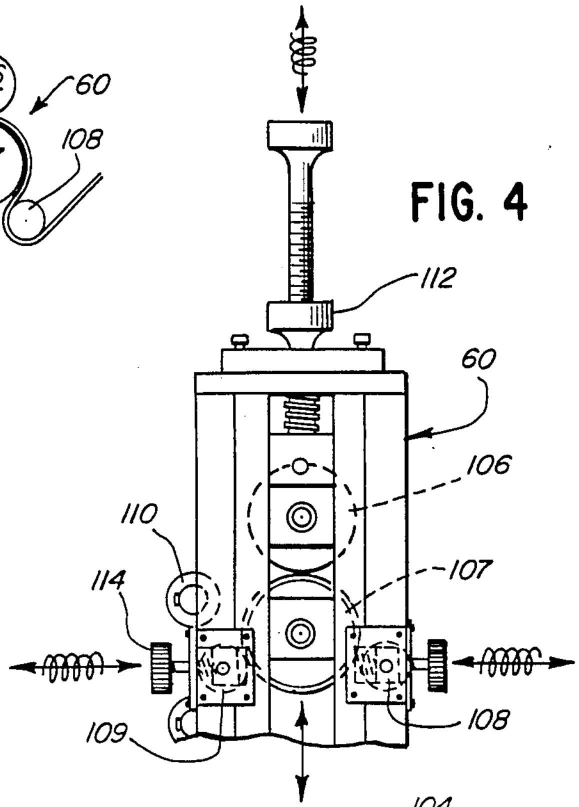
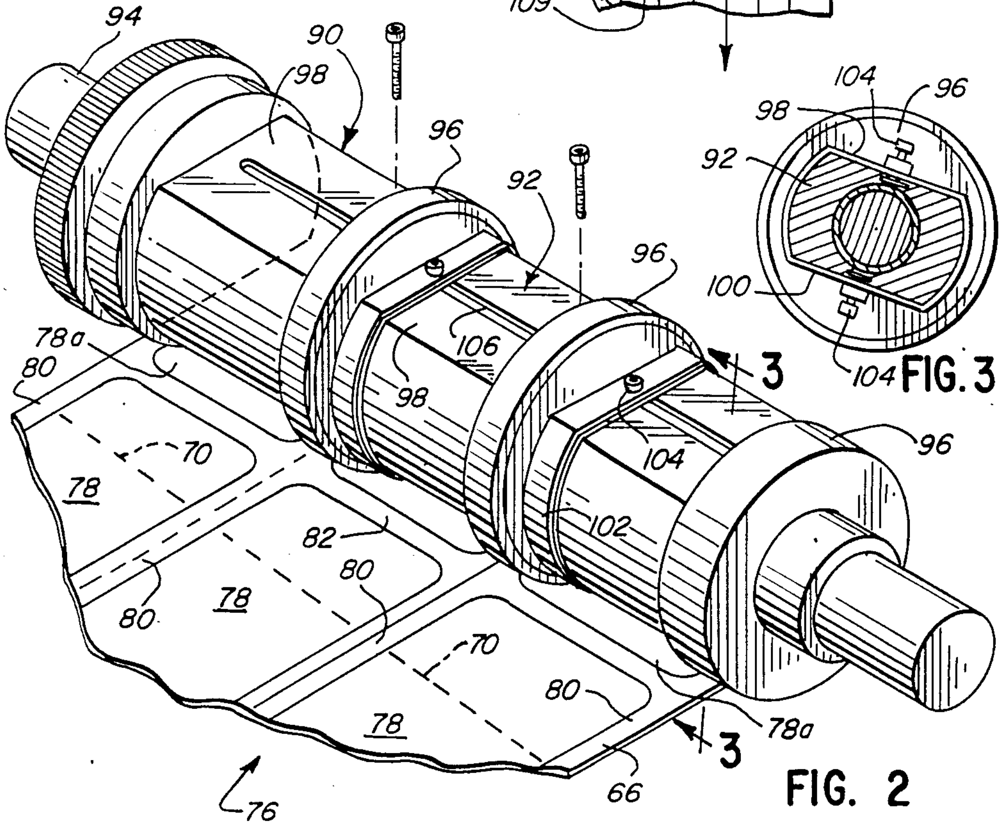
FIG. 2
FIG. 3

METHOD OF MANUFACTURING MULTILAYER LABELS AND APPARATUS THEREFOR

BACKGROUND OF THE INVENTION

In the packaging of certain chemicals, drugs, and the like, the need often arises to provide the user with a great deal of information on the label. This may be necessary because of regulations laid down by Government agencies, and also to provide the user with instructions on how to effectively and safely use the product, etc. Currently, a container requiring such detailed instructions is packed in an outer box along with a package insert. It of course is a fairly cumbersome operation to insert both the container and the package insert in the box. Also the package insert can get lost with ease since it is separate from the container.

Labels having multiple layers which may be opened for reading are well known. See for example U.S. Pat. Nos. 4,323,608 and 1,924,909, among others. However, success in the label market requires the manufacturers to provide labels that are very cost effective and inexpensive to manufacture.

By this invention, a method and apparatus are provided for manufacturing multi-layered labels for a fraction of the cost of the prior art labels. Furthermore, labels manufactured in accordance with this invention may exhibit added beneficial features from those of the prior art. For an example of improved design labels which may be manufactured in accordance with this invention, see the pending patent applications of Jory B. Mack, Ser. No. 696,773, filed Jan. 31, 1985, and entitled Multi-Layered Label.

DESCRIPTION OF THE INVENTION

In accordance with this invention a method and apparatus for manufacturing multilayer labels comprises the following:

One provides at least one continuous web with adhesive applied at least to spaced leaflet site portions of one face thereof. Leaflet members, which may be folded single strips or booklets for example, are applied to the spaced leaflet site portions. One presses the leaflet members and web together to adhere the leaflet members to the web. Thereafter, one cuts the continuous web to provide a plurality of separate, leaflet-carrying labels.

In a specific version of the above method, and apparatus for performing the method, one may provide first and second continuous webs, with at least the first web having an adhesive surface. One adheres leaflet members to the adhesive surface of the first web to place a plurality of the leaflet members on the first web in spaced relation to each other. The adhesive surface of the first web is then brought into adhering contact with the face of the second web, with the leaflet members being positioned between the adhering webs. One then forms a line of tearing weakness in one of the webs adjacent each leaflet member to permit opening of the one web along such line, for access to the leaflet member. Following this, one cuts the first and second webs to provide a plurality of separate, leaflet-carrying multilayer labels.

The adhesive surface of the first web may be covered with a first removable backing web. The first backing web may be removed prior to adhering the leaflet members to the first web.

A line of tearing weakness may be formed in the first web in a system where a second web is used, with the second web having an adhesive surface covered with a second, removable backing web facing away from the first web. Then, the first and second webs may be cut into separate labels without cutting the second backing web. As the result of this, the labels produced are removably carried on the second backing web, with the cut, superfluous web material being removed and discarded.

Die cutting means for performing such cutting may preferably be high precision cutting roller means, which is capable of accomplishing the selective cutting as described above.

It may be desirable to pass either or both of the webs through printing means prior to adhering the leaflet members to the first web. For example, the second web may carry a duplicate image of the outer label on the first web for identification of the container even if the first web and the leaflet are torn away after opening of the label.

It also may be desirable for the first and second webs to be brought together into adhering contact while positioned in a curved configuration of predetermined radius. As the result of this, the labels produced are more suitable for application to a curved surface. Particularly, the bonded first and second webs can be placed on a cylindrical container, for example, without ripples or lines appearing, as may happen when the two webs are brought together by conventional means in a planar configuration.

It may also be desired for a plurality of leaflet members to be adhered to the adhesive surface of the first web in side-by-side, spaced relation, with separate pluralities of the leaflet members being so adhered in longitudinally spaced relation. A great increase in the production rate of leaflet members can be achieved this way. The first and second webs may then be cut by die cutting means to form separate labels, typically each with a single leaflet member.

The leaflet members also may be die cut along with the first web (and second web when included) to provide a plurality of the labels in separate, side-by-side relation, each containing a cut portion of an original leaflet member positioned between the adhering webs.

The waste layer of excess material which is formed from portions of the first and second layers and the leaflet members by the die cutting process may be removed from the newly-formed labels and wound up into a roll for discard.

When both webs are passed through printing cylinder means prior to adhering the leaflet members to the first web, the printing cylinder means that prints the second web may be of slightly less circumference than the printing cylinder means that prints the first web, to counterbalance a small extra length of the first web processed, compared with the second web, per unit time. This is particularly useful in the situation previously described where the webs are brought together into adhering contact while positioned in a curved configuration of predetermined radius. In this circumstance, the outer web has a slightly larger radius of curvature than the inner web. This, as well as the web length distortions created by the presence of the various leaflets, can cause a differential in the length of one web which passes through the apparatus, when compared with the length of the other web. This differential can be accounted for in the manner described above.

In a specific embodiment of the system where first and second continuous webs are used, the first web may be inverted to receive the leaflets on its adhesive surface, and inverted again to enter into adhering contact with the second web while lying on top of the second web.

It can be seen that various functions must be carefully synchronized in order to successfully produce label members in accordance with this invention. Multiple functions of the process and apparatus of this invention may be controlled by operation of a single common control shaft extending the length of the apparatus for correlated operation.

In this invention a tractor roller is also provided, being particularly suitable for use when labels are manufactured in simultaneous, side-by-side manner with cut away portions of the backing web being removed. The tractor roller may be positioned at a point downstream of the area where the undesired portions of the web or webs are removed. The tractor roller may comprise a transversely positioned member having a plurality of circumferentially positioned rubber rings carried on the roller. The rings may provide frictional contact with predetermined portions of the web member for advancing the web member. Specifically, the rubber rings may contact longitudinal lines of exposed second backing web so that the roller means can advance the entire web system without encountering differences in thickness in the portion of the web system with which it is in contact.

The tractor roller system may define a portion of the ring-carrying, transversely disposed roller of a cross-section which defines at least one flat edge. Each ring has a bore of a shape that substantially matches the cross-section.

DESCRIPTION OF THE DRAWINGS

FIG. 2 is a perspective view of a tractor roller used in the process line of FIG. 1B, showing labels made in accordance with this invention;

FIG. 3 is a sectional view taken along line 3—3 of FIG. 2.

FIG. 4 is a fragmentary elevational view of a pressure roller system shown in FIG. 1B; and FIGS. 5 and 6 are schematic views showing how the pressure roller of FIG. 4 may be used to laminate separate webs together into a composite structure.

DESCRIPTION OF THE SPECIFIC EMBODIMENTS

Figure 1A:
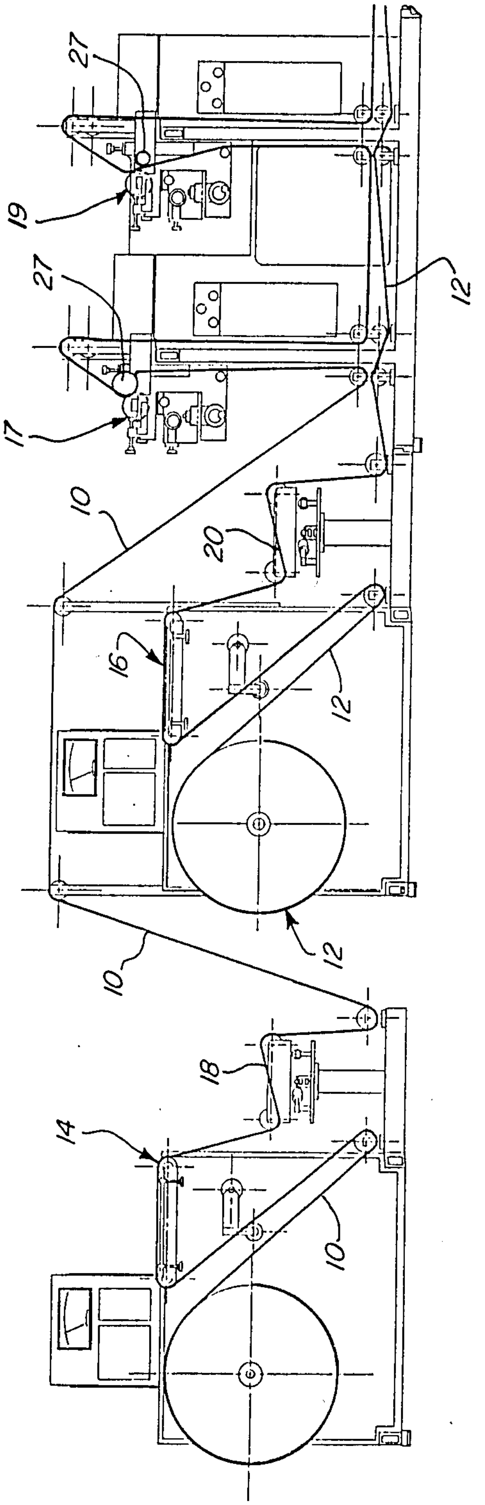
FIGS. 1A and 1B are partial elevational views which together show a process line for manufacturing multi-layer labels in accordance with this invention.
Figure 1B:
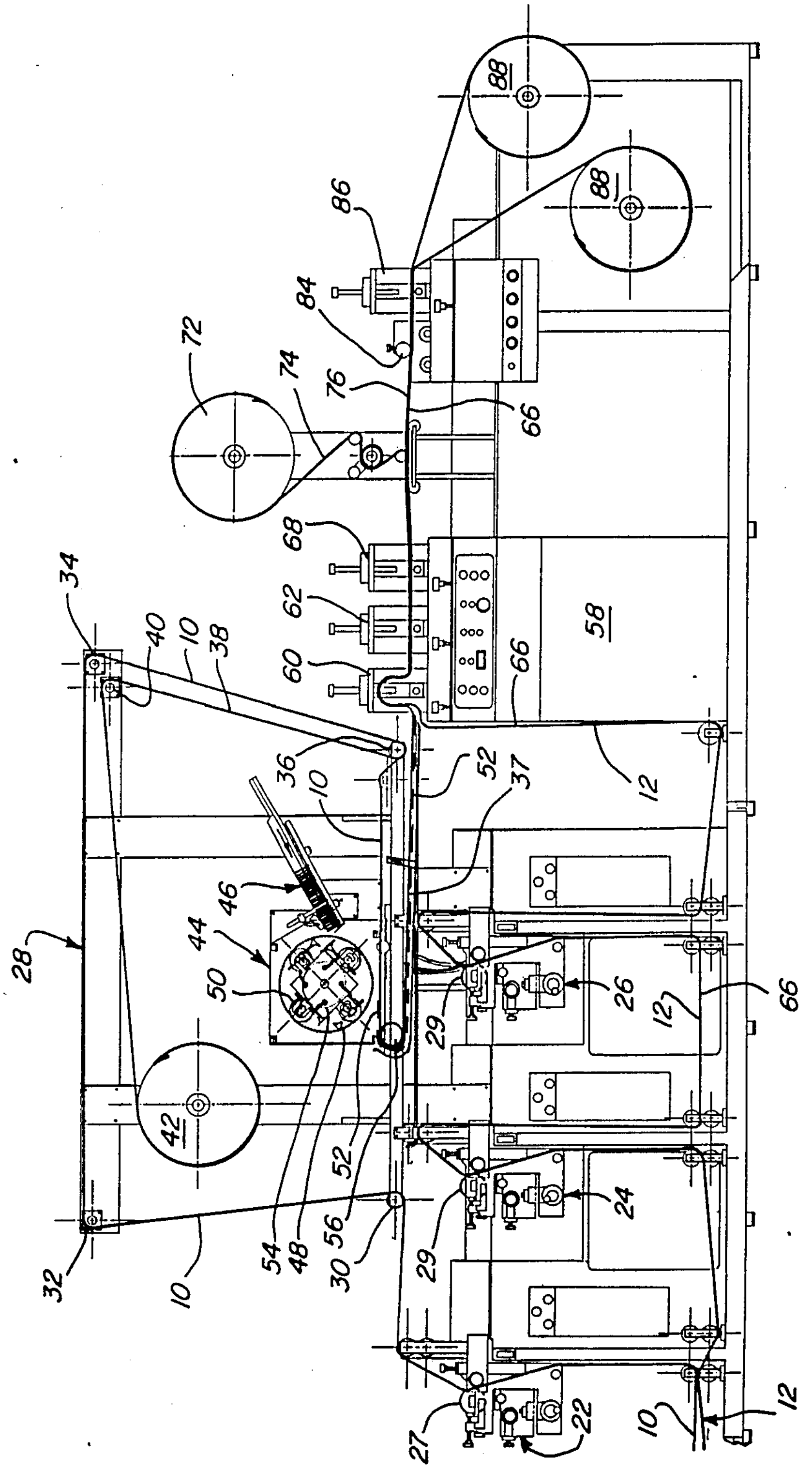

Referring to FIGS. 1A and 1B, rolls of continuous paper web 10, 12 are provided from web supply mechanisms 14, 16 of conventionally available design. Lateral positioning mechanisms 18, 20 are provided for each web to control the tension and the lateral positioning of webs 10, 12.

One or both of webs 10, 12 may be passed through printers. In the specific embodiment shown, web 10 is passed through printers 17, 19, and 22, while web 12 is passed through printers 24, 26 for two color printing of the webs. Printers 17–26 may be of a conventional, commercial design, and the number of printers, if any, that each of webs 10, 12 are passed through may vary to any degree desired, depending of course on the type of printing that is desired to be placed on webs 10, 12 and the multilayered labels that result therefrom.

Printers 17 through 26 may have printing cylinders 27, 29, for conventional rotary printing. However, printing cylinders 29, which in the specific embodiment are shown to print second web 12, may by of slightly less circumference than printing cylinders 27 which print first web 10. The effect of this is to counterbalance a small extra length of the first web processed, when compared with the second web, per unit time. This extra length may be created by the presence of the leaflets placed between the two webs 10, 12, and also because the two webs may be adhered together while in a curved configuration with web 10 on the outside, as discussed below.

After printing, web 10 is passed to leaflet application station 28. At station 28, web 10 runs about roller 30, 32, 34, and 36 to invert web 10. Both webs 10, 12 may have an adhesive surface on one face thereof covered with a removable backing web. After passage across roller 36, the adhesive layer of web 10 is facing upwardly, and at this point, backing layer 38 is stripped off web 10, passing across roller 40 to be wound on reel or spool 42. Web 10 with its upwardly facing layer of adhesive is then passed through leaflet application machine 44. A basic design of leaflet application machine 44 is commercially available from the MGS Machine Corporation of Minneapolis, Minn. Basically, a leaflet feed slot 46 feeds leaflets to suction cup members 48 which are carried upon rotatable circular gear members 50. The rotating suction cups pick up leaflets one by one from feed slot 46, and, as carrier 54 rotates, the counterrotating gear members cause suction cups 48 to deposite leaflets 52 at predetermined positions on the adhesive surface of inverted web 10.

Web 10 then undergoes a 180 degree rotation about roller 56, to cause web 10 to be directed toward laminating and processing station 58, with the adhesive side 37 of web 10 facing downwardly after passing 180 degrees about roller 56.

Webs 10 and 12 are brought together at laminating roller 60 with the two webs 10, 12 adhering together by adhesion of the adhesive face of web 10, with the individual leaflets 52 sandwiched between them. The laminated webs 10, 12 are then immediately passed through die cutting roller system 62, in which die cutting rollers cut away excess portions of webs 10, 12 and leaflets 52 as foraminous strip 74, to permit later separation of the individual laminated labels 78 (FIG. 2) comprising a portion of webs 10 and 12 surrounding and sandwiching a folded leaflet portion.

Web 12 also carries an adhesive side which is covered by removable backing web 66. Die cutting roller system 62 is set to make a precision cutting so that while webs 10, 12, and leaflet 52 are cut to form separate labels 78, backing web 66 remains uncut.

After passing through die cutting roller system 62, the composite system of bonded webs 10, 12 are passed into perforated roller system 68. Perforating rollers provide perforation line or lines 70 to each individual label in the particular pattern that is desired, to serve as lines of tearing weakness to permit the user to open the multilayer label products of this invention.

Web removal roll 72 is driven to peel away the foraminous scrap portion 74 of webs 10, 12 and leaflet 52, which was cut away from the finished labels by die cutting rollers 62, winding it up on a reel as shown. Accordingly, the downstream web portion 76 comprises backing web 66 with spaced labels 78 carried on the backing web, as shown in FIG. 2. It can also be seen in FIG. 2 how a plurality of labels 78 are positioned on backing web 66 in side-by-side, spaced relationship, after removal of foraminous scrap portion 74, to define longitudinally oriented linear spaces 80 and lateral spaces 82.

Other pluralities of labels 78*a* formed in side-by-side, spaced relation, are also adhered on backing web 66 in longitudinally spaced relation to labels 78.

After removal of scrap portion 74, backing layer web 66, and the labels 78 carried thereon, is passed through slitter member 84, of conventional design, to cut backing web 66 down the middle of longitudinal spaces 80 to separate backing web 66 into a plurality of separate strips, each carrying a linear array of labels 78, 78*a*, etc. The slit backing web 66 then passes through tractor roller means 86, and from there each individual strip portion of backing web 66 and the labels carried thereon may be rolled into separate coils 88 for storage of the labels in linear array. The user then may mount one or more of these coils 88 of removable labels into his automated or semi-automated apparatus, so that unwinding of the coils 88 presents a linear sequence of the label product of this invention.

Turning to FIGS. 2 and 3, tractor roller 90 of tractor roller means 86 is disclosed. Tractor roller 90 serves to advance the respective webs 10, 12, 66 through the process line for processing in accordance with this application. Roller 90 comprises a roller body 92 which is carried on axle 94. In accordance with this invention, a plurality of circumferentially positioned rubber rings 96 are provided to apply frictional contact with predetermined portions of the web member being advanced therethrough.

It can be seen from FIG. 2 that rubber rings 96 are positioned to roll along longitudinal spaces 80 of backing web 66, between the individual labels 78. The advantage of this is that tractor roller 90 operates to pull the web assembly along the process line while being in contact with a uniform thickness of material at all times; that is, the exposed portions of backing web 66 positioned between labels 78. If rings 96 were to pass over labels 78, they would encounter irregular thicknesses: too much thickness when label 78 is encountered and not enough thickness when lateral spaces 80 are encountered, which would result in possible slippage of a tractor roller and possible damage to the labels.

Tractor roller body 92 defines at least one flat face 98. Preferably another flat face 100 is defined on the body 92 on the side opposed from flat face 98. Thus the cross-section of roller body 92 typically defines a pair of flat edges 98, 100. Each ring 96 defines a bore which is of a shape that substantially matches the cross-section of body 92. Accordingly, rings 96 are carried on roller body 92 in a manner which substantially prevents relative rotation of the rings on the roller body.

Rings 96 may be laterally adjustable on roller body 92, being retained by collar 102 which may be retained at a predetermined location by the tightening of set screw 104 which can extend into groove 106 to retain rings 96.

Tractor roller 90 presses backing web 66 and the labels carried thereon against a flat, smooth platform surface below it having relatively low friction when compared with tractor roller 90, so that the respective webs and labels can be powered through the process line of this invention by the tractor roller.

Turning now to FIGS. 4 through 6, laminating roller assembly 60 is shown. Laminating roller assembly 60 is adjustable, with the various rollers 106 through 110 being respectively movable and adjustable by means of adjustment screws 112 through 114.

Laminating roller assembly 60 may be advantageously used in accordance with this invention to produce multilayer labels which are particularly suited for application to curved surfaces, for example, the face of a bottle or can. However, laminating roller assembly 60 may also be used in conventional manner where the respective webs are passed in a straight line through the assembly 60 for conventional lamination.

Turning now to FIG. 5, web 10 is shown approaching laminating roller assembly 60 with its adhesive layer 37 freed from its protective backing layer 38 and the individual leaflets adhering to adhesive layer 37 on the underside of web 10. Web 12 is approaching assembly 60 from another direction, with its intact backing web 66 in place on the face opposed to web 10. After web 10 is guided over roller 110 and web 12 is guided over roller 109, the two webs are brought together into adhering contact about roller 107 and under roller 106 while positioned in a curved configuration of predetermined radius, which is as defined by roller 107. The radius of curvature of web 10 in this circumstance is naturally slightly larger than web 12, since the distance of web 10 to the center of rotation of roller 107 is slightly greater than the corresponding distance of web 12. The combined webs adhere together due to the adhesion of the portions of adhesive surface 37 which are not adhering to leaflet members 52. Following this, the laminated web members are turned by roller 108 into a direction away from laminating roller assembly 60 toward die cutting roller system 62 for the next processing step.

Because the webs are brought together into adhering contact while positioned in a curved configuration, the application of the labels formed thereby to curved surfaces is facilitated. Multilayer labels which are laminated or pressed together while in a planar configuration can form unsightly wrinkles when applied to a curved surface. By this invention, the various components of the labels are brought together while in a curved configuration that preferably approximates the curved surface to which the labels will ultimately be applied. Thus the wrinkling problem is obviated.

In FIG. 5 roller 107 is relatively large for use when the label is to be applied to a surface of relatively high radius of curvature. In FIG. 6 the same apparatus is shown in which roller 107 has been replaced by smaller roller 107*a* so that the respective labels will be assembled by lamination on a surface of higher curvature, so that the labels can be more easily applied to smaller containers.

If desired, web 10, the first web, may be made of transparent material so that printing on leaflet 52 may show through. Second web 12 may also be made of transparent material, if desired, or alternatively of paper or other material. The leaflets 52 may be any desired multilayer type of paper or the like. They may be folded into a series of overlying panels, or they may be in booklet form, as is desired. Single thickness leaflets may also be used if that is desired. Also, if desired, the adhesive backing on the web to which the leaflet members are attached does not have to be continuous layers of adhesive, but may be applied in discreet areas; for example, the outermost panel of each leaflet member may be adhered to the continuous web on two opposed edges of the leaflet.

It may be desired to print lines or other patterns of adhesive on the face of continuous web 10 at spaced leaflet site portions. Thus, web material 10 without an adhesive layer may be used, and the desired adhesive distribution pattern may be printed by applying adhesive through print apparatus 27, for example, to its face.

Accordingly, by this invention the automated assembly of multilayered labels may be provided for efficient manufacture of a cost effective and valuable product.

The above has been offered for illustrative purposes only, and is not intended to limit the scope of the invention of this application, which is as defined in the claims below, That which is claimed is:

1. A method of manufacturing multilayer labels, which comprises:

providing first and second continuous webs, said first web having an adhesive surface; adhering leaflet members by automated means to said adhesive surface of the first web to place a plurality of said leaflet members on said first web in spaced relation to each other; bringing the adhesive surface of said first web into adhering contact with a face of said second web, with the leaflet members positioned between said adhering webs; forming a line of tearing weakness in said first web adjacent each leaflet member to permit opening of said first web for access for the leaflet member, said second web having an adhesive surface covered with a removable backing web facing away from said first web; and die cutting said first and second webs to provide a plurality of separate, leaflet-carrying, multilayer labels without cutting said backing web, whereby the labels produced are removably carried on said backing web.

2. The method of claim 1 in which the adhesive surface of the first web is covered with a removable backing web, and said backing web is removed prior to adhering said leaflet members.

3. The method of claim 1 in which said leaflet members are die cut along with the first and second webs to provide a plurality of said labels in separate, side-by-side relation, each containing a cut portion of an original leaflet member positioned between said adhering webs.

4. The method of claim 1 in which a waste layer of excess material is formed from portions of said first and second layers and said leaflet members, by said die cutting, and said waste layer is removed, from said newly-formed labels.

5. The method of claim 1 in which both webs are passed through printing cylinder means prior to adhering the leaflet members to said first web, the printing cylinder means that prints the second web being of slightly less circumference than the printing cylinder means that prints the first web, to counterbalance a small extra length of the first web processed, compared with the second web, per unit time.

6. The method of claim 1 in which a plurality of leaflet members are adhered to the adhesive surface of the first web in side-by-side, spaced relation, with separate pluralities of said leaflet members being so adhered in longitudinally spaced relation.

7. The method of claim 1 in which said first and second webs are cut by rotary die cutting means to form separate labels, each with a single leaflet member.

8. The method of claim 1 in which said first web is inverted to receive said leaflets, and inverted again to enter into adhering contact with the second web.

9. The method of claim 1 in which at least one web is passed through printing means prior to adhering the leaflet members to said first web.

10. A method of manufacturing multilayer labels, which comprises:

providing first and second continuous webs, at least said first web having an adhesive surface; adhering leaflet members by automated means to said adhesive surface of the first web to place a plurality of said leaflet members on said first web in spaced relation to each other; bringing the adhesive surface of said first web into adhering contact with a face of said second web, with the leaflet members positioned between said adhering webs; forming at least one line of tearing weakness in said first web adjacent the leaflet member to permit opening of said first web along said line for access to the leaflet member; and cutting said first and second webs to provide a plurality of separate, leaflet-carrying multilayer labels, said second web also having an adhesive surface on the side opposed to said first web, each adhesive surface of said first and second webs being respectively covered with first and second removable backing webs, said first backing web being removed prior to adhering said leaflet members, said first and second webs being die cut into separate labels without cutting said second backing web, whereby the labels produced are removably carried on said second backing web, said first and second webs being brought together into adhering contact while positioned in a curved configuration of predetermined radius, whereby the labels produced are more suitable for application to a curved surface.

11. The method of claim 10 in which said leaflet members are die cut along with the first and second webs to provide a plurality of said labels in separate side-by-side relation, each containing a cut portion of an original leaflet member positioned between said adhering webs.

12. The method of claim 11 in which a waste layer of excess material is formed from portions of said first and second layers and said leaflet members, by said die cutting, and said waste layer is removed from said newly-formed labels.

13. The method of claim 12 in which both webs are passed through printing cylinder means prior to adhering the leaflet members to said first web, the printing cylinder means that prints the second web being of slightly less circumference than the printing cylinder means that prints the first web, to counterbalance a small extra length of the first web processed, compared with the second web, per unit time.

14. The method of claim 13 in which said first web is inverted to receive said leaflets, and inverted again to enter into adhering contact with the second web.

15. The method of claim 14 in which said first and second webs are cut by rotary die cutting means to form separate labels, each with a single leaflet member.

16. The method of claim 15 in which said first and second webs are fed off of rolls of web material, and the labels so produced and removably carried on said second backing web are rewound into rolls at the end of the process.

17. A method of manufacturing multilayer labels, which comprises:

providing first and second continuous webs, said first web having an adhesive surface covered with a first removable backing web; removing said backing web; adhering by automated means a plurality of leaflet members to the adhesive surface of the first web in longitudinally spaced relation; bringing the adhesive surface of said first web into adhering contact with a face of said second web, with the leaflet members positioned between said adhering webs; forming at least one line of tearing weakness in said first web adjacent to each leaflet member to permit opening of said first web along said line for access to the leaflet member; said second web also having an adhesive surface covered with a second removable backing web facing away from said first web; and longitudinally die cutting said first and second webs and leaflet members to provide a plurality of separate, leafletcarrying, multilayer labels, in which said first and second webs are cut into separate labels without cutting said second backing web; removing portions of said first and second webs and leaflet members between cut, separate labels to provide exposed portions of the second backing web in transverse and longitudinal intersecting lines separating the individual labels, said webs and labels being advanced by tractor roller means, said roller means defining a plurality of rubber rings which are in frictional driving relation with longitudinal lines of the exposed second backing web so that the roller means can advance the entire web system without encountering differences in thickness in the portion of the web system with which it is in contact, said tractor roller means being positioned at a point downstream of the area where portions of the first and second webs and leaflet members are removed.

18. The method of claim 17 in which the first and second webs are brought together into adhering contact while positioned in a curved configuration of predetermined radius, whereby the labels produced are more suitable for application to a curved surface.

19. The method of claim 18 in which at least one of said webs is passed through printing means prior to adhering the leaflet members to said first web.

20. The method of claim 19 in which said first web is inverted to receive said leaflet and inverted again to enter into adhering contact with the second web.

21. The method of claim 17 in which both webs are passed through printing cylinder means prior to adhering the leaflet members to said first web, the printing cylinder means that prints the second web being of slightly less circumference than the printing cylinder means that prints the first web, to counterbalance a small extra length of the first web processed, compared with the second web, per unit time.

22. A method of manufacturing multilayer labels, which comprises:

providing first and second continuous webs, at least said first web having an adhesive surface; adhering leaflet members by automated means to said adhesive surface of the first web to place a plurality of said leaflet members on said first web in spaced relation to each other; bringing the adhesive surface of said first web into adhering contact with face of said second web while portions of said first and second webs coming into said adhering contact are positioned in a curved configuration of predetermined radius, with said leaflet members being positioned between said adhering webs; forming a line of tearing weakness in the first web, which has the larger radius of curvature in said curved configuration, to permit opening of said line of weakness for access to the leaflet member; and die cutting said first and second webs to provide a plurality of separate, leaflet-carrying, multilayer labels.

23. The method of claim 22 in which both webs are passed through printing cylinder means prior to adhering the leaflet members to said first web, the printing cylinder means that prints the second web being of slightly less circumference than the printing cylinder means that prints the first web, to counterbalance a small extra length of the first web processed, compared with the second web, per unit time.

24. A method of manufacturing multilayer labels, which comprises:

providing first and second continuous webs, at least said first web having an adhesive surface; passing both webs through printing cylinder means, the printing cylinder means that prints the second web being of slightly less circumference that the printing cylinder means that prints the first web; adhering leaflet members by automated means to said adhesive surface of the first web to place a plurality of said leaflet members on said first web in spaced relation to each other; bringing the adhesive surface of said first web into adhering contact with the face of said second web, with the leaflet members positioned between said adhering webs; said differential circumference between the printing cylinder means serving to counterbalance a small extra length of the first web processed, compared with the second web, per unit time; forming a line of tearing weakness in one of said webs adjacent each leaflet member to permit opening of said one web for access to the leaflet member; and die cutting said first and second webs to provide a plurality of separate, leaflet-carrying, multilayer labels.

25. Apparatus for manufacturing multilayer labels which comprises traction means for passing first and second continuous webs through a process line, said first and second webs each carrying an adhesive coating on one side covered with a backing web; means for removing said backing web from said first web; means for delivering leaflet members to said adhesive coated surface on said first web to place a plurality of said leaflet members on said first web in spaced relation to each other; means for bringing said first and second webs into intimate, sealed contact with the leaflet members positioned between said sealed webs, with the side of said second web which carries its backing web facing outwardly; means for forming at least one line of tearing weakness in said first web adjacent each leaflet member to permit opening of said first web along said line for access to the leaflet member; and means for die cutting said first and second webs without cutting the backing web of said second web to provide a plurality of separate, leaflet-carrying, multilayer labels removably carried on said backing web.

26. The apparatus of claim 25 in which said means for bringing the first and second webs together into intimate contact causes said webs to be positioned in a curved configuration of predetermined radius while being so brought into intimate contact, whereby the labels produced are more suitable for application to a curved surface.

27. The apparatus of claim 26 including printing means for providing printed indicia on at least one of said webs.

28. The apparatus of claim 27 including means for inverting said first web prior to receiving said leaflets and then inverting said web and leaflets again and bringing into intimate, sealed contact with the second web with the leaflets positioned between said webs.

29. Apparatus for manufacturing multilayer labels which comprises traction means for passing first and second continuous webs through a process line; means for delivering leaflet members to a surface on said first web to place a plurality of said leaflet members on said first web in spaced relation to each other; means for bringing said first and second webs into intimate, sealed contact with the leaflet members positioned between said sealed webs; means for forming at least one line of tearing weakness in said first continuous web adjacent each leaflet member to permit opening of said first web along said line for access to the leaflet member; means to die cut said first and second webs into separate labels after the webs have been brought together, without cutting a backing web upon which they are carried, whereby the labels produced are removably carried on said backing web, said means for bringing the first and second webs together into intimate, sealed contact causing said webs to be positioned in a curved configuration of predetermined radius while being so brought into intimate contact, whereby the labels produced are more suitable for application to a curved surface.

30. The apparatus of claim 29 including means for inverting said first web prior to receiving said leaflet members and then inverting said web and leaflet members again into intimate, sealed contact with the second web with the leaflets positioned between the webs.

31. The apparatus of claim 30 in which take-up means are provided for removing a first backing web from said first web prior to placing the leaflet members on the first web.

* * * * *